Sept. 24, 1957     L. D. STATHAM     2,807,167
PRESSURE GAGE WITH TEMPERATURE COMPENSATION
Filed Oct. 18, 1954     3 Sheets-Sheet 1
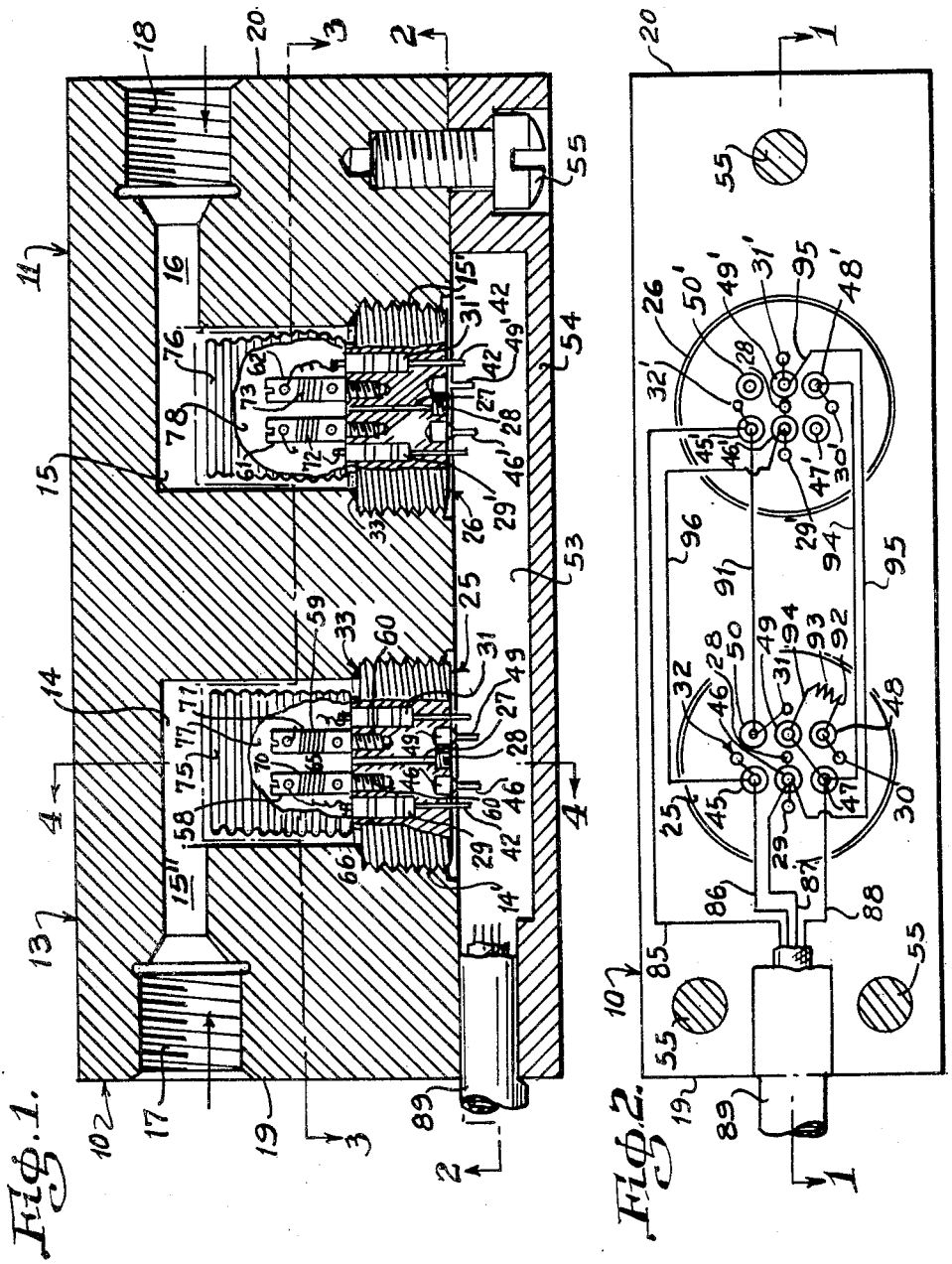
INVENTOR.
LOUIS D. STATHAM
BY
ATTORNEY.

Sept. 24, 1957 L. D. STATHAM 2,807,167
PRESSURE GAGE WITH TEMPERATURE COMPENSATION
Filed Oct. 18, 1954 3 Sheets-Sheet 2
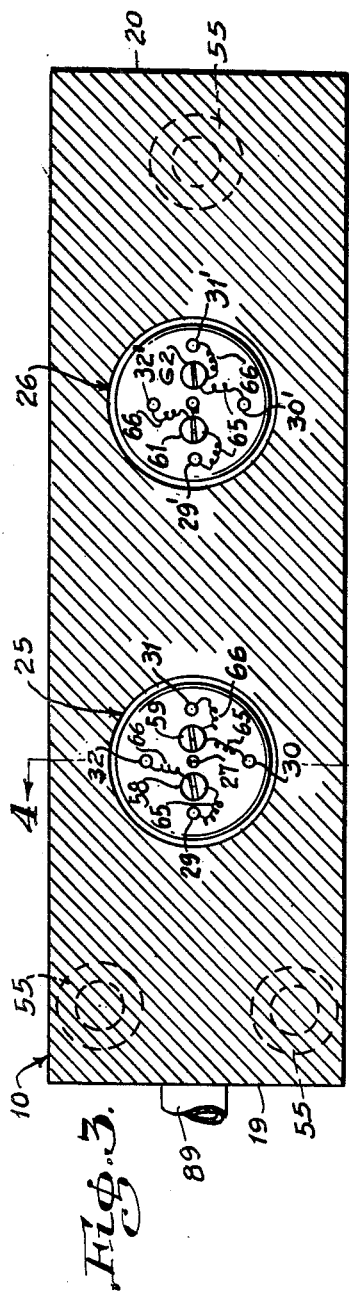
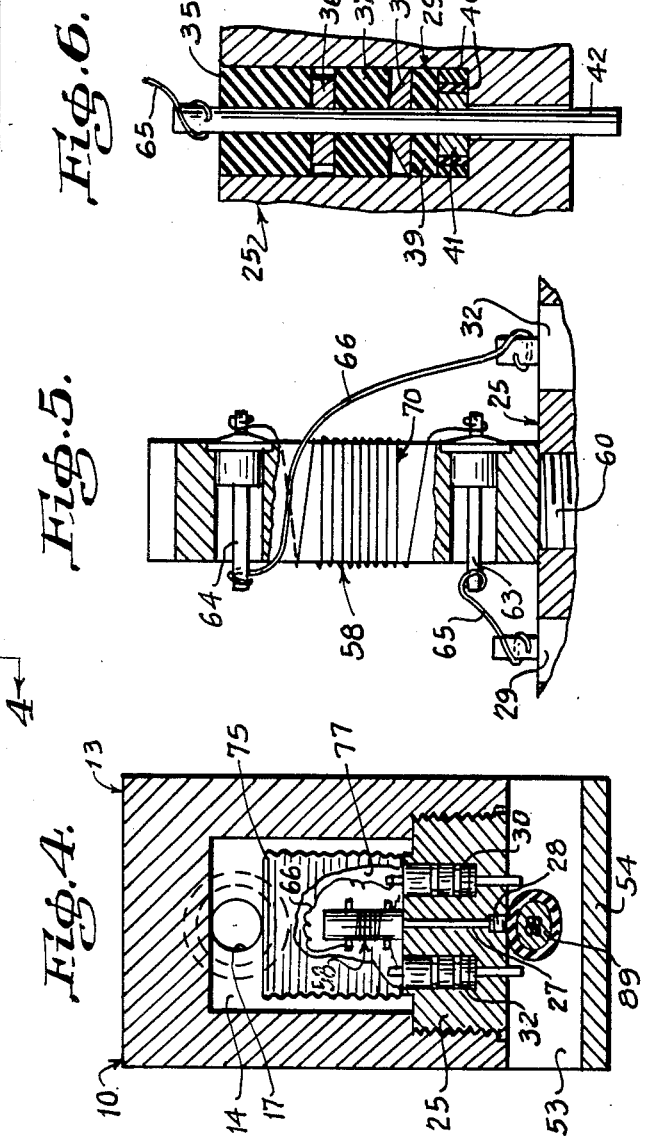
INVENTOR.
LOUIS D. STATHAM
BY
ATTORNEY.

Sept. 24, 1957 L. D. STATHAM 2,807,167
PRESSURE GAGE WITH TEMPERATURE COMPENSATION
Filed Oct. 18, 1954 3 Sheets-Sheet 3

INVENTOR.
LOUIS D. STATHAM
BY
ATTORNEY.

United States Patent Office 2,807,167
Patented Sept. 24, 1957

2,807,167

PRESSURE GAGE WITH TEMPERATURE COMPENSATION

Louis D. Statham, Beverly Hills, Calif., assignor to Statham Laboratories, Inc., Los Angeles, Calif., a corporation of California Application October 18, 1954, Serial No. 462,760

6 Claims. (Cl. 73—398)

This invention relates to transducers, particularly in the form of pressure gages, and is especially concerned with a novel device for measuring or sensing high pressures.

When a metallic member is subjected to force or pressure so that it is subjected to a volume compressive force, its resistance changes. The degree of resistance change depends upon the nature of the metal. Thus, if a wire is immersed in a liquid and the liquid is subjected to a pressure, this pressure is transmitted to all surfaces of the wire to cause a volume compression of the wire and a reduction in resistance results. This phenomenon is to be distinguished from the change in resistance occurring when a wire is subjected to change in axial tension or a rod to changes in axial compression, in which case the resistance change results from the variation in length and cross section resulting from the application of such forces.

In transducers employing the foregoing phenomenon, the wire also changes in resistance due to ambient temperature changes and temperature changes resulting from passage of current through the wire where the wire is employed in a bridge circuit responsive to the resistance changes. These changes in resistance cannot be distinguished from a change in resistance due to a force or pressure to which the wire is subjected according to the above phenomenon. Hence, measurement of forces or pressures by such devices introduces an error proportional to the effect of the above temperature changes on the wire, and in measuring high pressures, such an error may be of substantial magnitude.

It is an object of the invention to design a transducer based on the above described phenomenon, and which has improved accuracy.

Another object is the provision of a pressure gage or transducer especially adapted for response to, or measurement of, high pressure or differential pressure, and which is substantially insensitive to ambient temperature change.

A still further object is to provide a force or pressure sensing device of the foregoing type wherein resistance changes due to temperature changes to which the wire or filament of the device is subjected, are substantially cancelled out.

Yet another object of the invention is the provision of a transducer responsive to a large force, and which is simple, compact, durable, and dependable in operation.

According to a preferred embodiment of the invention, I incorporate in a substantially symmetrical housing a pair of juxtaposed pressure chambers. In each of said pressure chambers is formed a separate pressure vessel which is isolated from the remainder of the chamber and from the fluid whose pressure is to be measured, by a flexible partition in the form of a bellows, diaphragm or the like. A resistance wire or filament system, preferably composed of a pair of separate resistance filaments, is positioned in each pressure vessel and spaced from the flexible partition, and each vessel is filled with a suitable liquid. Electrical connections are brought out from the filaments in the pressure vessels and are connected in a suitable electrical arrangement, such as a Wheatstone bridge, which responds to or measures changes of resistance in the respective filaments due to changes in force or pressure exerted against the flexible partition or diaphragm of each vessel and transmitted by the liquid therein against the filaments. Since such changes in resistance are directly proportional to changes in the force or pressure so exerted against the diaphragms and the filaments, my device, which is responsive to such resistance changes, provides a measure of the force or pressure, or change in force or pressure, exerted against the diaphragms.

To avoid the effect of changes of resistance in the filaments due to changes in temperature, for example, of the liquid or oil in the pressure vessels in which the filaments are immersed, the housing is constructed of a material having a high heat conductivity and relatively high mass so as to neutralize or minimize the effects of suddent external temperature variations in such filaments, and the juxtaposed pressure chambers or cells in which the respective pressure vessels are mounted are located sufficiently close together as to be subjected substantially to the same ambient temperature conditions at the same time. Further, such cells and each of the components thereof should be substantial duplicates of each other in size, geometry, mass, and structural material. In this manner the changes in resistance of the filaments in both pressure vessels due to the aforementioned temperature variations will be substantially the same. By connecting these filaments to a sensing means or device, e. g., by arranging such filaments in a bridge circuit, so as to cancel out the equal temperature-induced resistance variations in the filaments, the sensing means responds only to variations in resistance of the filaments induced by force or pressure exerted against the diaphragms and transmitted by the liquid in the vessels against the filaments.

The device of the invention is particularly adapted to measurement of large forces or high pressures, e. g., on the order of, for example, 5,000 p. s. i. and higher. It is noted that the filaments according to the invention are fixedly mounted in the pressure vessels and that they remain substantially stationary therein during operation of my device. Also, the diaphragms, bellows or other flexible membranes employed move or oscillate a relatively small amount, corresponding to the degree of compressibility of the liquid in the pressure vessels, even at the high pressures generally encountered in operation of my device.

A preferred illustrative embodiment of the invention is described below in connection with the accompanying drawing wherein:

Fig. 1 is a sectional elevation of the device, taken on line 1—1 of Fig. 2, certain components being broken away for clarity;

Fig. 2 is a sectional view on line 2—2 of Fig. 1, looking in the direction of the arrows;

Fig. 3 is a horizontal section taken on line 3—3 of Fig. 1;

Fig. 4 is a section taken on line 4—4 of Fig. 3;

Fig. 5 is an enlarged view, shown partly in section, of the means for positioning and supporting a wire or filament in the pressure vessels of the device;

Fig. 6 is an enlarged sectional view of the structure of liquid tight pressure terminals of the device;

Figure 8:
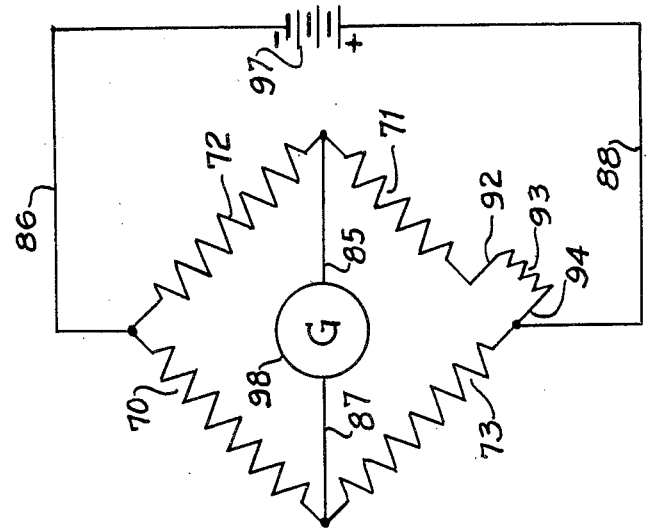
Fig. 8 is a simplified schematic diagram of the circuit of Fig. 7.

Numeral 10 represents a case or housing of an instrument according to the invention, which is designed to measure pressures, the housing being formed of two symmetrical half portions 11 and 13 and being essentially oblong in shape. In half portions 11 and 13 are pressure chambers or cavities 14 and 15, respectively, which are enlarged in diameter and internally threaded at their lower ends 14' and 15'. Communicating with the upper ends of such chambers are a pair of conduits 15" and 16 making connection at their opposite ends with threaded pressure inlets 17 and 18 positioned in the opposite ends 19 and 20 of case 10, for the introduction of pressure fluid into chambers 14 and 15 for measurement of the differential pressure of the fluid in such chambers.

Threaded into the lower ends 14' and 15' of chambers 14 and 15 are plugs 25 and 26, in each of which is a centrally positioned bore 27 receiving at their lower ends a plug 28. Plugs 25 and 26 are made fluid tight with respect to chambers 14 and 15 by means of gaskets 33. As seen more clearly in Fig. 2, plug 25 has four pressure-tight insulated terminals 29, 30, 31 and 32, positioned radially therein, and plug 26 also has four similar insulated terminals 29', 30', 31', and 32', positioned radially therein. Referring particularly to Fig. 6, each of such terminals, e. g., 29, is preferably composed of successive layers of mica 35, metal 36, rubber 37, metal 38, mica 39, and Bakelite pieces 40 molded about the metal piece 41, with a steel terminal rod 42 passing through such layers of material and protruding below and above the plugs 25 and 26. If desired, however, other types of pressure tight insulated terminals may be employed. Positioned substantially within the periphery defined by the four terminals 29 to 32 in the lower end of plug 25 are two parallel rows of terminals, with three terminals in each row, these terminals being designated by the numerals 45, 46, 47, 48, 49 and 50; similar terminals 45', 46', 47', 48', 49' and 50' are formed in and extend from the lower end of plug 26.

All of the above described terminals extend downwardly from plugs 25 and 26 into a space 53 formed in the lower part of the case 10 by a U-shaped base member 54 connected to the body of the case by means of screws such as 55.

A pair of insulators 58 and 59 having depending threaded portions 60 are positioned in plug 25 by screwing such portions into the body of the plug, and a similar pair of insulators 61 and 62 are positioned in plug 26. Insulators 58 and 59 are spaced from each other closely adjacent bore 27, and are in substantial alignment with terminals 46 and 49, and insulators 61 and 62 are also spaced from each other and in substantial alignment with terminals 46' and 49'.

As seen in Fig. 5, illustrating the structure of each of the insulators, e. g., 58, a terminal rod 63 is transversely positioned in the lower portion of the body of the insulator, and a second terminal rod 64 is transversely positioned in the upper portion of the insulator body. A wire 65 connects one end of the lower terminal rod 63 of insulator 58 with the upper end of terminal 29, and a wire 66 connects one end of the upper terminal rod 64 with the upper end of terminal 32. Referring to Fig. 3 particularly, similar wires 65 and 66 connect the two terminals at opposite ends of insulator 59 with the upper ends of terminals 30 and 31, respectively. The same arrangement of wires is connected between the terminals of insulator 61 and the upper ends of terminals 29' and 32', and between the terminals of insulator 62 and the upper ends of terminals 30' and 31'. A metallic wire filament 70 is tightly wound about insulator 58 and connected at its ends to the lower and upper terminals 63 and 64 of the insulator. Wire filaments 71, 72 and 73 are wound in similar fashion about insulators 59, 61 and 62, respectively, and connected at their ends to the respective terminals of such insulators.

Positioned over insulators 58 and 59, and spaced from the top of chamber 14 and the sides thereof, is a flexible bellows 75, and similarly positioned over insulators 61 and 62 is a flexible bellows 76. The bellows 75 and 76 are attached at their lower ends to plugs 25 and 26, respectively, by suitable means, e. g., soldering, to form a fluid tight seal. It is thus seen that bellows 75 and 76 form pressure vessels 77 and 78, respectively, vessel 77 containing insulators 58 and 59 with their respective filament windings 70 and 71, wire connections 65 and 66, and the upper ends of terminals 29 to 32, and vessel 78 containing insulators 61 and 62 with their respective filaments 72 and 73, wire connections 65 and 66, and the upper ends of terminals 29' to 32'.

It is further particularly noted that the insulators 58, 59, 61 and 62, and the filaments 70 to 73 positioned thereon are spaced from and are out of contact with bellows 75 and 76. All of such insulators are of substantially the same size and all of filaments 70 to 73 are of the same material and essentially the same length, as are connectors 65 and 66. Also, terminals 29 to 32, and 29' to 32', are of the same size and structure, as are 45 to 50 and 45' to 50'. The metal filaments 70 to 73 may be formed from any suitable material such as manganin (a copper-base alloy containing about 12% manganese and 4% nickel), or gold-chromium alloys. The filament used is preferably one having a minimum temperature resistance response, although other types of filaments than those specifically mentioned may be used. Such filaments may be wound in the form of a helical coil as shown in Figs. 1 and 5, or these filaments may be of a non-inductive type, e. g., in the form of a straight wire or a bifilar coil or loop. However, regardless of the type of winding of the filament, it is understood that the same type of winding is employed for all of the filaments 70 to 73.

The volume of pressure vessel 77 within flexible bellows 75 is substantially the same as the volume of pressure vessel 78 within flexible bellows 76. Liquid is placed in vessels 77 and 78 by removing plugs 28 in bores 27 and passing the liquid therethrough, such liquid occupying the entire volume of both of these vessels so that the filaments 70 to 73 therein are completely immersed in the liquid. Suitable liquids, which are non-conductive, i. e., insulating liquids, include, for example, silicone oils or petroleum light lubricating oil. The liquid or oil in the pressure vessels in which the filaments 70 to 73 are immersed acts as an insulator with respect to the filament. Also, the liquid protects the filament from corrosion and oxidation by atmospheric elements. Further, the liquid functions to transmit the force or pressure exerted against the bellows of the device, and applies such pressure against the filaments.

It is noted that housing 10 has a relatively large mass and is constructed of a material of high heat conductivity such as steel or other metal, so that ambient temperature changes both in the surrounding atmosphere and the fluid whose temperature is being measured will cause but small temperature variation in the metallic mass which will be equalized between the two pressure cells 14 and 15. Further, the pressure cells 14 and 15 are positioned close to each other and hence can be considered to be located in the same zone so that the same ambient temperature conditions will affect both cells equally. These cells are symmetrical within housing 10, and the components of such cells are also of substantially identical size, structure and mass, as previously indicated. Hence, the changes in resistance of the filaments 70 to 73 in pressure vessels 77 and 78 resulting from temperature changes to which these filaments are subjected, are substantially equal.

Figure 7:
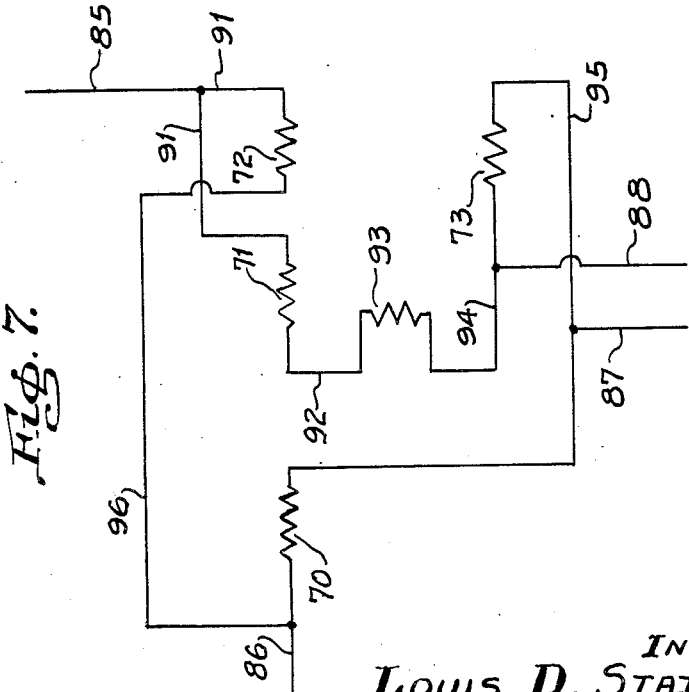
Fig. 7 is a wiring diagram of the bridge circuit of my device.

As illustrated in Figs. 2, 7 and 8, filaments 70 to 73 are connected in a Wheatstone bridge arrangement or circuit, wherein filaments 70 and 71 contained in pressure vessel 77, constitute one pair of opposite resistances of the bridge circuit, and filaments 72 and 73 contained in pressure vessel 78 constitute the other pair of opposite resistances of the bridge.

The bridge circuit is formed by introducing four externally extending electrical leads 85, 86, 87 and 88 housed in an insulated conduit 89, into the space 53 formed in the lower part of the case 10, and connecting lead 85 to terminal 45', lead 86 to terminal 45, lead 87 to terminal 46 and lead 88 to terminal 47. A lead 91 connects terminals 32', 45', 50 and 31, thereby electrically connecting filament 72 with filament 71. A lead 92 is connected between filament 71 and a trim resistor 93, by connecting lead 92 to terminals 30 and 48 and to such resistor. The other end of resistor 93 is connected via lead 94 and terminals 49, 47, 48' and 30', to filament 73, and the latter is connected to filament 70 by means of lead 95 connecting terminals 31', 49', 46 and 29. Filament 70 is in turn connected to filament 72 by means of lead 96 connecting terminals 32, 45, 46' and 29'. Leads 86 and 88 are connected across the terminals of a battery 97, and leads 85 and 87 are connected to an instrument sensitive to changes in flow of electrical current, such as a galvanometer 98.

It is seen from the foregoing circuit arrangement that since filaments 70 and 71 are arranged opposite each other in the bridge circuit, and filaments 72 and 73 are also arranged opposite each other, and adjacent filaments 70 and 71, changes in resistance of filaments 70 and 71 in pressure vessel 77, and/or changes in resistance of filaments 72 and 73 in pressure vessel 78, due to temperature effects, will be cancelled out in the bridge circuit. Hence, the net change in resistance sensed in the bridge circuit will be due only to forces or pressures to which the filaments are subjected.

My device may be used to measure a single pressure or differential pressures. Preferably the invention device is employed to measure differential pressures of relatively large magnitude, e. g., on the order of 5,000 p. s. i. To measure a single positive gage pressure, one of the inlets, say 17, is connected to the atmosphere while the pressure to be measured is applied through the other inlet 18. Where a differential pressure is to be measured, the respective pressures are applied through inlets 17 and 18. The pressures so applied impinge on flexible bellows 75 and 76 positioned in pressure chambers 14 and 15. These pressures are transmitted by the bellows to the fluid in pressure vessels 77 and 78 and by such fluid to the filaments 70 to 73, which remain substantially stationary in position on their respective insulators 58, 59, 61 and 62. The transmitted pressures thus exerted against such filaments cause them to change their respective resistances to an electrical current produced by battery 97 (see Fig. 8), in proportion to the pressure to which the filaments are respectively subjected. The change in resistance of these filaments yields an electrical output sensed by the galvanometer G in Fig. 8, corresponding to the pressure differential between the presesures at inlets 17 and 18, any changes in resistance of such filaments due to temperature variations being cancelled out in the manner described above.

In place of flexible bellows, such as members 75 and 76 of the device described above, I may employ any suitable resilient or yieldable member such as a diaphragm or piston.

Instead of measuring pressure, I may employ my device for sensing or measuring any other force or displacement which is converted into a displacement of the flexible bellows or equivalent element employed in my device.

While I have described a particular embodiment of my invention for the purpose of illustration, it should be understood that various modifications and adaptations thereof may be made within the spirit of the invention as set forth in the appended claims.

I claim:

1. A transducer which comprises a housing of high heat conductivity and relatively large mass, said housing having a substantially symmetrical geometric configuration, a pair of adjacent chambers of essentially equal size positioned substantially symmetrically within said housing, a pressure inlet to each of said chambers, a closed container within each of said chambers, each of said containers being similarly located in their respective chambers, each of said containers having a resilient wall, a liquid filling said containers and in contact with said walls, a metal wire fixedly mounted in each of said containers adjacent said resilient walls and immersed in said liquid, said wires being spaced from and out of contact with said resilient walls, said wires changing in electrical resistance in response to temperature changes and to variations in force exerted against said resilient walls and transmitted thereby to said liquid and to said wires, each of said containers and the respective components thereof having substantially the same size, configuration and mass and being constructed of substantially the same material, and means connected to each of said wires for sensing change in resistance therein in response to said force while cancelling out changes in resistance of said wires in response to temperature variations.

2. A pressure transducer which comprises a housing, a pair of closely adjacent chambers of essentially equal size positioned substantially symmetrically within said housing, a closed pressure vessel located in substantially the same ambient temperature zone within each of said chambers, a pressure inlet to each of said chambers exteriorly of said vessels, each of said vessels including a flexible bellows forming a wall of said vessels, a liquid filling said vessels and in contact with said bellows, a metal filament in each of said vessels and immersed in said liquid, the ends of each said filament being fixedly mounted on a wall of said vessel adjacent said bellows, and said filaments being free from contact with said bellows, said filaments changing in electrical resistance in response to temperature changes and to variations in force exerted against each of said bellows and transmitted thereby to said liquid and to said filaments, each of said vessels and the respective components thereof having substantially the same size, configuration and mass and being constructed of substantially the same material, and means connected to each of said filaments for sensing change in resistance therein in response to said variations in force, said last-named means being insensitive to variations in resistance of said wires in response to any temperature changes to which each of said filaments is subjected.

3. A pressure transducer for sensing relatively high pressures, which comprises a case, a pair of pressure housings disposed in juxtaposed relation to each other symmetrically within said case and in substantially the same ambient temperature zone, each of said housings having a pressure inlet, a pressure vessel in each of said housings communicating with said inlet, a flexible member forming a wall of each said vessel, a liquid filling said vessels and in contact with said flexible members, a pair of metal filaments in each of said vessels and immersed in said liquid, the ends of each of said filaments being fixedly mounted on a wall of said vessel adjacent said flexible member, said filaments being spaced from and out of contact with said members, said filaments changing in electrical resistance in response to temperature changes and to variations in pressure exerted against said flexible members and transmitted thereby to said liquid and to said filaments, each of said housings and the respective components thereof having substantially the same size, configuration, and mass and being constructed of substantially the same material, so that each of said filaments is subjected to substantially the same temperature changes, and means connected to each of said filaments for sensing changes in resistance therein due to said variations in pressure while being non-responsive to changes in resistance of said filaments due to said temperature changes.

4. A pressure transducer for sensing relatively high pressures, which comprises a presure housing constructed of a material of high heat conductivity and having a relatively large mass, said housing having a first pressure inlet at one end and a second pressure inlet at the opposite end, spaced apart first and second chambers positioned within said housing, said chambers being respectively in communication with said first and second inlets, a first pressure vessel mounted in said first chamber, a second pressure vessel mounted in the other of said chambers, a first flexible bellows forming a wall of said first vessel and positioned adjacent said first inlet, a second flexible bellows forming a wall of said second vessel and positioned adjacent said second inlet, a liquid filling each of said vessels and in contact with the respective bellows thereof, a pair of insulators fixedly mounted in each of said vessels, a metal filament wound about each of said insulators, each of said insulators and filaments being immersed in said liquid, the ends of each of said filaments being mounted on a stationary wall of said vessels, said walls being located on the opposite side of said bellows from said inlets, said insulators and filaments being spaced from and out of contact with said bellows, each of said filaments changing in electrical resistance in response to temperature changes and to variations in pressure exerted against said flexible bellows and transmitted thereby to said liquid and to said filaments, said chambers and each of said pressure vessels being located in substantially the same ambient temperature zone, said housing being substantially symmetrical about an axis between said chambers, each of said chambers, pressure vessels and the respective components thereof having substantially the same size, configuration and mass, and being constructed of substantially the same material, so that each of said filaments is subjected to substantially the same temperature changes, and means connected to each of said filaments for sensing changes in resistance therein due to said variations in pressure exerted through said inlets against the respective bellows, while cancelling out changes in resistance of said filaments due to said temperature changes.

5. A pressure transducer as defined in claim 4, wherein said sensing means is in the form of a bridge circuit in which the two filaments in each of the respective pressure vessels constitute resistances on opposite sides of said bridge circuit, each of said filaments in one pressure vessel being connected in series with the filaments in the other pressure vessel to form said circuit.

6. A pressure transducer which comprises a pressure housing of high heat conductivity and relatively large mass, said housing having a first pressure inlet at one end and a second pressure inlet at the opposite end, spaced apart first and second chambers positioned within said housing, said chambers being respectively in communication with said first and second inlets, a first pressure vessel mounted in said first chamber, a second pressure vessel mounted in said second chamber, a pair of plugs in said housing, each plug forming a wall of each of said chambers, a flexible bellows connected at its open end to each of said plugs within said chambers, each of said plugs and its associated bellows forming a pressure vessel within each of said chambers, a liquid within each of said vessels and in contact with substantially the entire inner wall of the bellows thereof, a pair of insulators fixedly mounted on each said plug within each of said vessels, a metal filament wound about each of said insulators, each of said insulators and filaments being immersed in said liquid, terminals mounted on each of said plugs, the ends of each of said filaments being connected to said terminals, said insulators and filaments being spaced from and out of contact with said bellows, each of said filaments changing in electrical resistance in response to temperature changes and to variations in pressure exerted against said flexible bellows and transmitted thereby to said liquid and to said filaments, said chambers and each of said pressure vessels being located in substantially the same ambient temperature zone, said housing being substantially symmetrical about an axis between said chambers, each of said chambers, pressure vessels and the respective components thereof having substantially the same size, configuration and mass, and being constructed of substantially the same material, so that each of said filaments is subjected to substantially the same temperature changes, and means connected to each of said filaments for sensing changes in resistance therein due to said variations in pressure exerted through said inlets against the respective bellows, while cancelling out changes in resistance of said filaments due to said temperature changes.

References Cited in the file of this patent

UNITED STATES PATENTS 2,680,376   Shaw et al.  --------------- June 8, 1954

FOREIGN PATENTS 895,637   France  ---------------- Apr. 11, 1944